Patented July 29, 1947

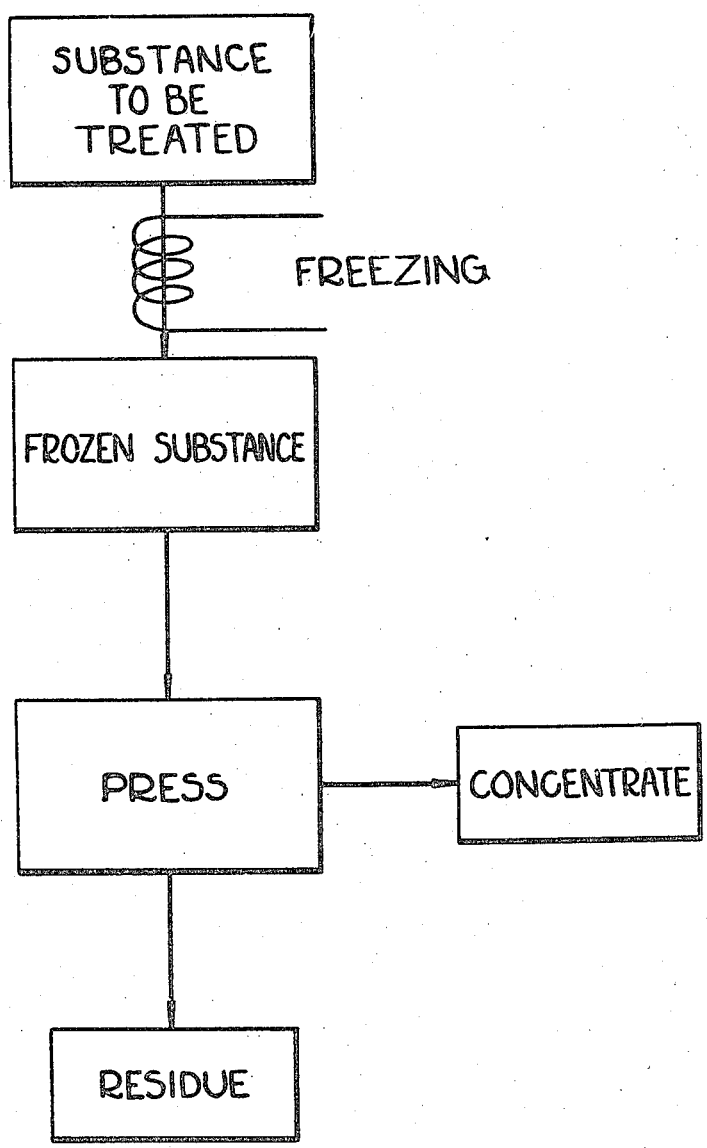

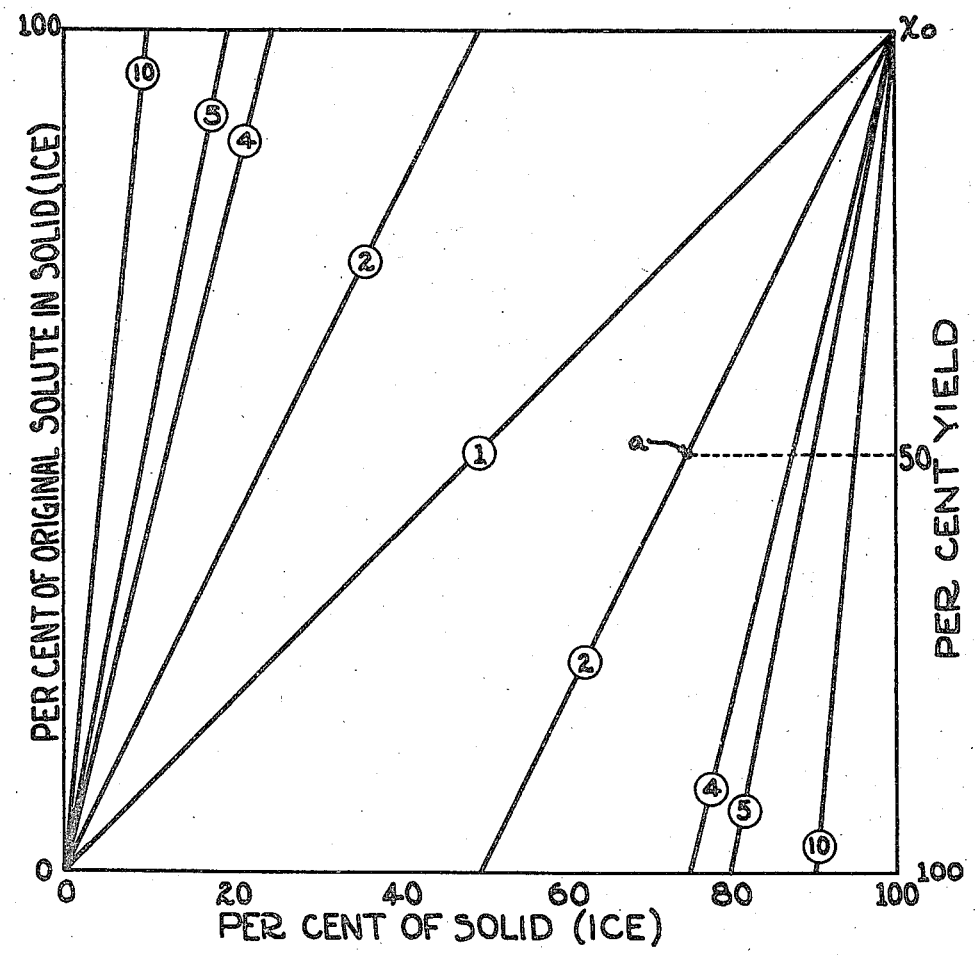
FIG. II

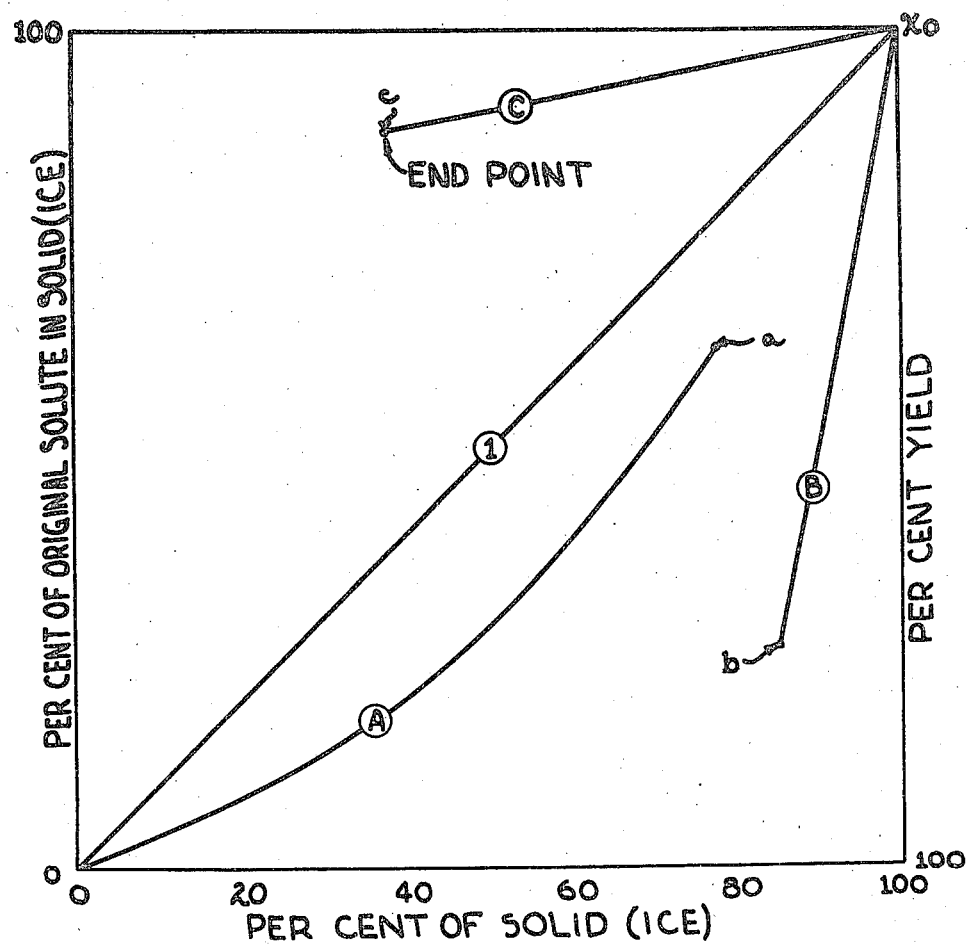

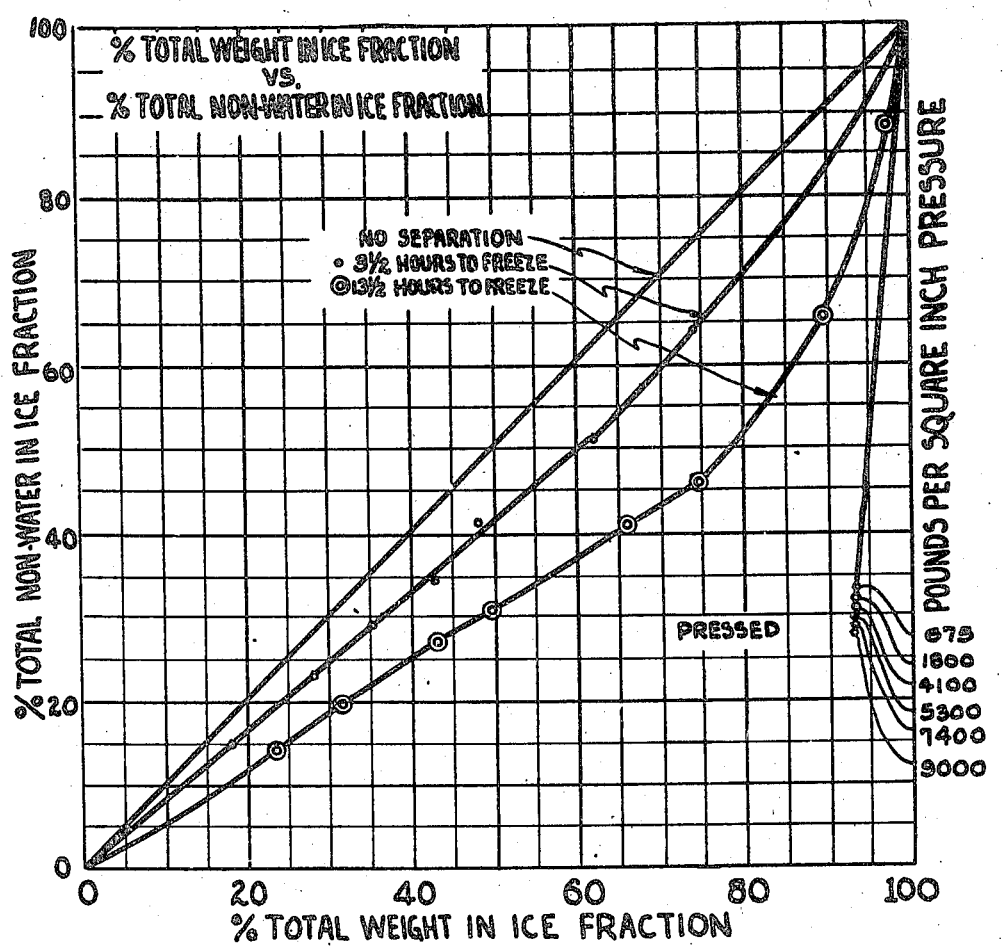

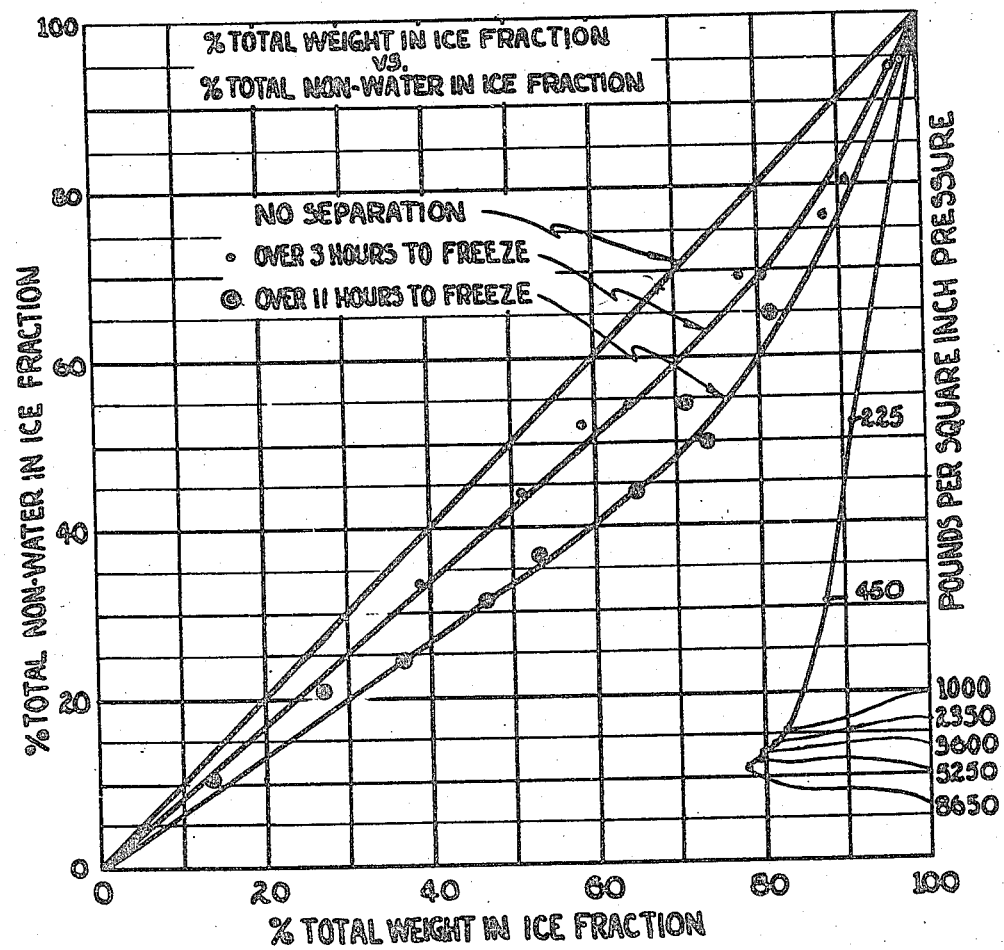

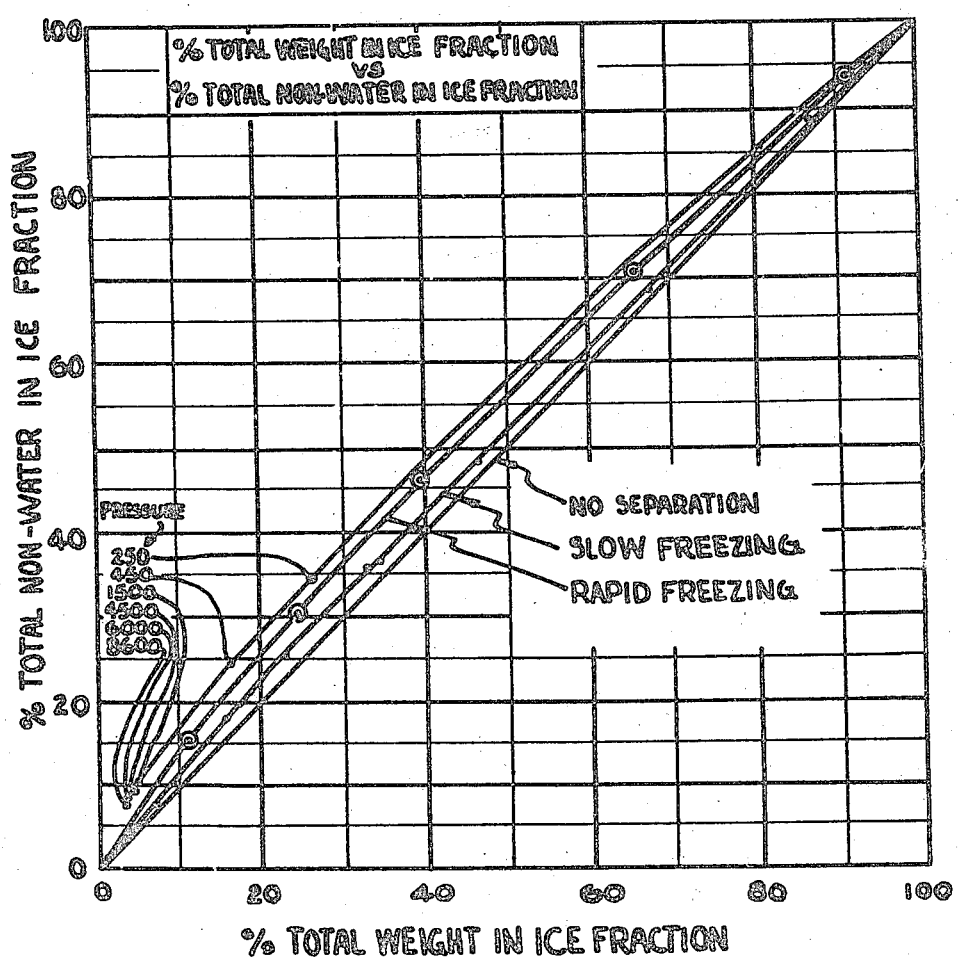

2,424,663

UNITED STATES PATENT OFFICE 2,424,663

REMOVAL OF WATER FROM AQUEOUS SOLUTIONS

Hermon L. Mantle, Painesville, Ohio, assignor to The Commonwealth Engineering Company of Ohio, Dayton, Ohio, a corporation of Ohio Application December 22, 1944, Serial No. 569,378

4 Claims. (Cl. 99—205)

This invention relates to method for concentrating water solutions.

The method of the present invention is well adapted for concentrating water solutions of various sorts, and the term "water solutions" as used herein is intended to encompass not only "true solutions" in the scientific sense but also "practical solutions." Such "practical solutions" include those wherein the solute is partly in suspension or in dispersion in an aqueous menstruum. Typical of such "practical solutions" are the juices of fruits and vegetables; milk; maple, cane, beet and sorghum juices and syrups; body fluids and extracts of tissues; and similar other substances which in their native state or in modified form contain water.

Prior to the present invention water solutions were concentrated by one or more of the following methods:

(a) Solar evaporation.
(b) Evaporation of water by heating.
(c) Removal of water by vacuum with or without heating.
(d) Partial freezing and separation of the two phases.

According to the method of this invention, the solution to be concentrated or dewatered is frozen substantially completely, the frozen mass is subjected to pressure, and concentrate is separated from the residual ice as a result of the pressing operation.

The method of the present invention is particularly well adapted for producing fruit juice concentrates exhibiting the characteristic of remaining fresh and wholesome over long periods of time without the addition of preservatives or extraneous matter of any type.

Fruit juices and other similar food products concentrated by dewatering according to the method of this invention may be stored for long periods of time without deleterious effect, and may be brought to their original condition with respect to consistency, flavor, aroma, and palatability by the simple addition of water. The resulting product will possess all of the desirable qualities and properties originally present in the material. Needless to say, the mineral content of the fresh material is neither destroyed nor reduced nor altered by concentration according to the method of the present invention.

The present invention will be fully understood from the following description taken in connection with the annexed drawings, wherein—

Figure I is a diagrammatic representation of the essential steps of the method of this invention;

Figure II diagrammatically illustrates the theoretical concept of this invention;

Figure III diagrammatically illustrates the theoretical concept of this invention as compared with the theory of separation of water by partial freezing;

Figure IV diagrammatically illustrates experimenal results obtained in concentrating a sugar solution by the method of this invention and ordinary freezing methods;

Figure V diagrammatically illustrates experimental results obtained in concentrating a salt solution by the method of this invention and ordinary freezing methods; and Figure VI represents substantially the same conditions as in Figure V but with a solution of higher concentration.

In order to point out the difference and superiority of my method of concentrating water solutions compared with the older methods which also employ freezing, I shall make use of the diagrammatic system illustrated in Figure II.

Figure II is made by plotting the results of any partial freezing or melting as a point within the field of a square in which distances along the horizontal, from left to right, are proportional to the weighed amount of total solid matter present; and vertical distances, from the base line to the point, represent the proportional amount of solute present in the solid. The reverse distances, respectively, will represent the liquid solution present and the proportion of solute in this liquid. Thus the straight line from o, o to the upper right hand corner x, will represent a series of points which would be the results from a freezing where no change in concentration occurred in either the solid or liquid portions of the mixture at any time during the freezing. Such a line, or series of points, can only occur when the solution is either instantaneously frozen, or when its concentration is the exact eutectic mixture for the concentration present.

Suppose a solution of 95% water and 5% solute were partially frozen until 75% of the total was solid with 25% liquid, and that this 25% liquid contained half of the original solute, thus the solid would contain the other half of the solute. This result would be represented by point a on the diagram. The actual concentration of solute in the liquid would be 10% instead of the original 5% or twice as great. This ratio I shall term the coefficient of concentration, which in this case would be 2. If I plot several points representing concentration coefficients of 2 for different amounts of freezing, the line 2 will result. In like manner I can construct similar lines for other concentration coefficients. I have plotted such lines for concentration coefficients of 4, 5 and 10. The line from o, o to the upper right hand corner of this square (Figure II) becomes a member of this family of lines representing the concentration coefficient of 1, meaning that there is no concentration change at any point thereon.

A simple mathematical relation will be observed to exist between these lines of concentration coefficients and the intercept of these lines on the horizontal axis. If the values expressed on this axis are decimal parts, this relationship becomes:

$$\frac{1}{1-d}=C$$

(where $d$ is the decimal part and $C$ is the coefficient). If expressed in percent:

$$\frac{100}{100-\%}=C$$

This family of lines pertains to those cases where the initial concentrations are less than the eutectic mixture concentration. Another similar family of lines, lying above line 1, and radiating from the lower left hand corner can be developed for those initial concentrations which are greater than the eutectic concentration. In such a case the concentration of solute will increase in the solid phase instead of in the liquid phase.

Yields can be evaluated from this chart as well as concentrations. Take point $a$ for example. Draw a horizontal line to the right hand vertical axis where the yield may then be read on a scale of percents starting at the top as zero and running to 100 at the bottom.

I shall now demonstrate the difference of my method of concentrating dilute solutions compared with the older practices. (By the term "dilute solution" I mean any solution wherein the proportion of solute is less than that required for a eutectic mixture).

Figure III is constructed substantially identically with Figure II. Now suppose we consider the case of hard cider being concentrated by partial freezing such as would occur in storage at below freezing temperatures for sustained duration. Part of the cider will freeze leaving a liquid portion which is richer in the solute components of the original cider. If successive samples are taken from the whole mass of cider and "ice" while it was freezing, and if these samples are analyzed and the successive points plotted as in Figure III, a curved line A results. This line will be closer to, or farther from, line 1, depending on whether the rate of freezing is faster or slower than the case illustrated by line A.

It is this phenomenon, namely, that the solute from dilute solutions tends to increase in concentration in the liquid portion of a partially frozen solution, which has been relied upon, previously, to concentrate various solutions by various freezing methods. Thus, for example, if one desired to obtain a concentration of the cider previously mentioned, one would cause it to freeze as described until it arrived at a point such as $a$, on Figure III and then one would separate the liquid portion from the "ice." Simple decantation would accomplish much of this separation, but not all. One might then centrifuge the residual "ice" or apply mild pressures in suitable apparatus to "squeeze out" the liquid, trapped among the "ice" particles. I wish to point out, however, that pressure if so applied, is used solely for the purpose of separating the liquid from the "ice" and not for concentrating the solute in the liquid portion. No such concentration occurs in any practical sense.

The method of concentrating aqueous solutions which I have developed is essentially and entirely different than the procedure described above. Referring to Figure III, it is obvious that I must start with a solution represented as point o, o, since this is the normal condition in which such solutions are obtained. However, from o, o, I proceed to point $x$ (the upper right hand corner of the diagram of Figure III), by whatever means are most convenient. Thus, by quick freezing I might almost follow line 1, or by slower freezing I might follow A, extending it to $x$, by continued freezing. The point which I wish to emphasize is that the route by which $x$ is reached has no bearing on the result. My sole object is to freeze the entire mass completely or substantially so. Next I apply pressure to this frozen mass. I am obviously not applying this pressure to "squeeze out" trapped liquid, since substantially no liquid exists therein. I have observed that frozen aqueous solutions, like frozen water itself, lower their melting points under pressure; so, under the pressures which I apply the melting point of this frozen mass is lowered and part of the mass melts and becomes liquid. The composition of this liquid will be practically the same as that mixture of solute in water which has the lowest melting point; i. e., the eutectic mixture at the pressure being applied. This liquid will be expelled from the frozen mass if the apparatus in which the pressure is applied is so designed that it will permit the escape of the liquid. The liquid may then be collected and will represent the concentrated product.

If samples of this liquid are progressively taken, analyzed, and the results plotted, a line such as B will result with a point such as $b$, recording the final result.

When I apply this method of concentration to solutions stronger (more concentrated) than the eutectic mixture, I obtain a line such as C, which represents the concentration in the solid phase. Such a procedure can result, under proper conditions, in a water-free sample of solute, and hence this line C, must stop short of the left hand vertical axis. I am representing such a condition as point $c$. This theoretical limitation of extension does not apply to dilute solutions as represented by line B.

When eutectic mixtures are so treated, no such results are obtained.

By the method of the present invention it is possible to provide a food product concentrate that has the requisite amount of sugar (such as 60% or more for the preservation of orange juice and similar fluids) without the addition of any preservative agent. Such a concentrate will retain its vitamin content, its natural taste, its minerals and the like, so that there is no substantial change in the taste or food value of the concentrate when the water which has been removed from the original solution in the production thereof is ultimately restored at the time of use. Such food concentrates have been preserved over long periods of time without any addition agent or preservative, and they have been employed as foods and as beverages satisfactorily after simply adding water to return them to their original density or concentration. It will be understood that one of the essentials of this process is first to freeze the solution from which the water is to be removed substantially completely, and then compress the frozen mass at progressively increasing pressure to separate therefrom a liquid concentrate the composition of which will vary according to the temperature-pressure relationship existing at the moment of exposure. In other words, as the concentration of solute in the frozen mass varies, eutectic mixtures are formed and are expelled.

It is desirable for the proper carrying out of the method of this invention, that the frozen mass fed to the press or expeller be in relatively finely divided form. If the liquid to be dewatered is sprayed or delivered as a thin film onto the freezing surface, most satisfactory results are obtained; however, heavier films or sheets of frozen mass may be processed satisfactorily, but they should be broken up before being delivered by the expeller or pressure means in order to obtain most satisfactory results.

By way of example, and without thereby intending to limit the present invention to the particular conditions, proportions and materials set forth, the following examples of the application of the method of this invention are given:

Example I

Material worked with: Spindled and strained Florida orange juice.
Number of pounds in sample: 14 pounds.
Density before freezing: 10.4° Brix.
How frozen: In pan.
Temperature of freezing surface: —10° F.
Temperature of storage room: —10° F.
Temperature of frozen mass just before pressing: —12° F.
Temperature of press room: —10° F.
Temperature of liquid from press: +12° F.
Temperature of ice from press: +18° F.
Number of pounds of liquid from press: 2 pounds 9 ounces.
Number of pounds of ice from press: 10 pounds 9 ounces.
Density of liquid from press: 42.7° Brix.
Analysis of water from melted ice: 1.4% sugar.
Balance: Waste.

Example II

Material worked with: Grapefruit juice.
Number of pounds in sample: 17 pounds.
Density before freezing: 10° Brix.
How frozen: In pan.
Temperature of freezing surface: +10° F.
Temperature of storage room: +10° F.
Temperature of frozen mass just before pressing: +8° F.
Temperature of press room: +9° F.
Temperature of liquid from press: +18° F.
Temperature of ice from press: +17° F.
Number of pounds of liquid from press: 3 pounds 12 ounces.
Number of pounds of ice from press: 12 pounds 6 ounces.
Density of liquid from press: 33° Brix.
Analysis of water from melted ice: Sugar .7%. 12 ounces concentrate from machine 19° Brix.
Balance: Waste.

Example III

Material worked with: Cider partially concentrated.
Number of pounds in sample: 7 pounds 11 ounces.
Density before freezing: 20° Brix.
How frozen: On Dry Ice in —10° F. room.
Temperature of freezing surface: —50° F.
Temperature of storage room: —50° F.
Temperature of frozen mass just before pressing: —20° F.
Temperature of press room: —9° F.
Temperature of liquid from press: +40° F.
Temperature of ice from press: +8° F.
Number of pounds of liquid from press: 1 pound 8 ounces.
Number of pounds of ice from press: 4 pounds 5 ounces.
Density of liquid from press: 46%.
Balance: Waste.

Example IV

Material worked with: Cider.
Number of pounds in sample: 14 pounds.
Density before freezing: 3.5° Brix.
How frozen: In barrel.
Temperature of freezing surface: 0° F.
Temperature of storage room: —9° F.
Temperature of frozen mass just before pressing: —10° F.
Temperature of press room: —8.5° F.
Temperature of liquid from press: +22° F.
Temperature of ice from press: +26° F.
Number of pounds of liquid from press: 2 pounds 12 ounces.
Number of pounds of ice from press: 11 pounds 3 ounces.
Density of liquid from press: 23%.
Analysis of water from melted ice: 0.7%.
Balance: Waste.

Example V

Material worked with: Tomato juice.
Number of pounds in sample: 13 pounds 4 ounces.
How frozen: In pan.
Temperature of freezing surface: +10° F.
Temperature of storage room: +11° F.
Temperature of press room: +11° F.
Temperature of liquid from press: +20° F.
Temperature of ice from press: +23° F.
Number of pounds of liquid from press: 3 pounds 6 ounces.
Number of pounds of ice from press: 9 pounds 5 ounces.
Analysis of water from melted ice: .0% soluble solids.
Balance: Waste.

While Figure II and Figure III illustrate the theoretical concept of the present invention, Figure IV, Figure V and Figure VI are based on actual experimental data.

Figure IV illustrates the application of pressures at measured points from 675 pounds per square inch to 9,000 pounds per square inch to a sugar solution containing 5.16% of sucrose. The theoretical line running diagonally across the diagram from the lower left hand corner to the upper right hand corner illustrates the curve obtained when no separation occurs. The slightly bent line running thereunder having points marked with single circles illustrates the results obtained when freezing is carried out at a relatively fast rate (3½ hours). The third curve having points indicated by double circles illustrates the results obtained when a relatively longer freezing period is employed (13½ hours). The last curve, which begins at the upper right hand corner of the diagram and falls downwardly sharply, illustrates the results obtained according to the method of the present invention. It will be noted that there is no limitation according to the method of this invention as to the means whereby the complete or substantially complete freezing of the mixture takes place.

Figure V illustrates the results obtained using a salt solution containing 5.50% of sodium chloride. It will be noted that pressures of from 225 pounds to 8650 pounds per square inch were employed in this instance.

Figure VI illustrates the results obtained when using a salt solution of greater concentration (26.45% sodium chloride). It will be noted that pressures from 250 pounds to 8600 pounds per square inch were employed.

It will be understood that the range of pressures given herein is purely illustrative. The pressure used depends on the concentration of solute in the original solution and the concentration desired in the concentrate. Higher and lower pressures than those specifically disclosed herein may be used advantageously.

It will be further understood that while there have been described certain specific embodiments of the method of the present invention, it is not intended thereby that this invention be limited to or circumscribed by the specific details of procedure, conditions, arrangement of parts, materials and the like herein described or illustrated in the annexed drawings, in view of the fact that this invention is susceptible to changes depending on individual preference and conditions without departing from the spirit of this disclosure and the scope of the appended claims.

This application is a continuation-in-part of copending application Serial No. 352,240, filed August 12, 1940.

I claim:

1. In a process of extracting a liquid concentrate comprising the step (a) of freezing a solution less concentrated than the eutectic so that as heat is abstracted ice first solidifies out leaving the liquid in a more concentrated solution until the eutectic composition and temperature at the pressure of the freezing is reached by said concentrated solution; the step (b) of freezing to a solid by further abstraction of heat so that there solidifies out at a constant temperature the eutectic solid mixture as an intimate mixture of ice and solute; the step (c) of melting the eutectic solid mixture by gradually increasing the compression so as to squeeze out the resulting liquid phase; and the step (d) of discarding the ice that is substantially free of the liquid concentrate.

2. In a process of extracting a liquid concentrate comprising the step (a) of freezing a solution less concentrated than the eutectic so that as heat is abstracted ice first solidifies out leaving the liquid in a more concentrated solution until the eutectic composition and temperature at the pressure of the freezing is reached by said concentrated solution; the step (b) of freezing to a solid by further abstraction of heat so that there solidifies out at a constant temperature the eutectic solid mixture as an intimate mixture of ice and solute; the step (c) of melting the eutectic solid mixture by gradually increasing the compression so as to squeeze out the resulting eutectic concentrate; and the step (d) of discarding the ice that is substantially free of the liquid concentrate.

3. In a process of extracting a liquid concentrate comprising the step (a) of freezing a solution less concentrated than the eutectic so that as heat is abstracted ice first solidifies out leaving the liquid in a more concentrated solution until the eutectic composition and temperature at the pressure of the freezing is reached by said concentrated solution; the step (b) of freezing to a solid by further abstraction of heat so that there solidifies out at a constant temperature the eutectic solid mixture as an intimate mixture of ice and solute; the step (c) of melting the eutectic solid mixture by gradually increasing the compression so as to squeeze out the resulting eutectic concentrate; and the step (d) of discarding the ice that is substantially free of the liquid concentrate; and the step (e) of conducting the foregoing process under conditions of temperature sufficiently low to prevent the melting by reason of the surrounding temperature of the solid ice and sufficiently high not to freeze the liquid concentrate when once abstracted.

4. In a process of extracting a liquid concentrate comprising the step (a) of freezing a solution less concentrated than the eutectic so that as heat is abstracted ice first solidifies out leaving the liquid in a more concentrated solution until the eutectic composition and temperature at the pressure of the freezing is reached by said concentrated solution; the step (b) of freezing to a solid by further abstraction of heat so that there solidifies out at a constant temperature the eutectic solid mixture as an intimate mixture of ice and solute and while expanding the eutectic solution to form a eutectic solid mixture to thereby disturb the continuity of the ice; the step (d) of melting the eutectic solid mixture by gradually increasing the compression so as to squeeze out the resulting eutectic concentrate; and the step (e) of discarding the ice that is substantially free of the liquid concentrate.

HERMON L. MANTLE.

REFERENCES CITED

The following references are of record in the file of this patent:

UNITED STATES PATENTS

| Number | Name | Date |
| --- | --- | --- |
| 1,979,124 | Tival | Oct. 30, 1934 |
| 2,241,726 | Krouse | May 13, 1941 |